Patented Nov. 6, 1934

1,980,083

UNITED STATES PATENT OFFICE 1,980,083

PREPARATION OF ACIDOPHILUS PRODUCTS

William Ludwell Owen, Baton Rouge, La., assignor to Lacto-Yeast Company, Inc., Baton Rouge, La., a corporation of Louisiana No Drawing. Application February 16, 1932, Serial No. 593,419

6 Claims. (Cl. 167—73)

This invention relates to the preparation of products containing Lacto-bacillus acidophilus, and particularly concerns a method of making such a product for human consumption, and the product so made.

The great therapeutic value of the ingestion of Lacto-bacillus acidophilus has long been known. In recent years physicians have unreservedly endorsed the acidophilus therapy, and the importance of implanting, in the digestive system, strains of the Lacto-bacillus acidophilus is now fully appreciated by the general public. The great difficulty in connection with the general use of acidophilus-carrying foods has been the ease with which other bacteria of the lactic acid group completely suppress the acidophilus species, and the uncertainty prevailing that any of these foods actually contain any appreciable number of the desired species in a viable condition. One of the earliest methods, and the one most commonly used for the development of the acidophilus bacteria for employment in food, involves their propagation in milk. Milk is a natural medium for the organism and carries with it the food required by the organism for its development. But it has been found in practice to be very difficult to propagate the organisms continuously in this medium in sufficient purity for utilization on an industrial scale. In the first place, in order to propagate the organisms in a pure condition, the milk has first to be sterilized at a very high temperature to kill off all the spores, as well as the vegetative cells of other more resistant bacteria. Even after developing a pure culture of the acidophilus bacteria in milk, they frequently die off after a few transfers, and an ordinary lactic acid buttermilk results, without the therapeutic values of the acidophilus culture.

Since the value of the use of acidophilus foods, or the acidophilus therapy, consists solely in the implantation in the digestive tract of the living Lacto-bacillus acidophilus, any method for carrying a maximum number of these species in any substance is of great therapeutic value.

Other menstra are employed, in addition to the use of acidophilus milk, as carriers for the Lacto-bacilli. Such for example is the liquid milk whey in which it can be developed. Further, it is sometimes incorporated in some inert carrier, such as starch or chalk, and sold in tablet form. But in all of these methods, deteriorative changes set in at the very beginning, and the bacteria progressively diminish in numbers and in virility, so that even though the products are kept at low temperatures, yet the cultures and tablets are soon practically inert in the desired therapeutic values.

According to the present invention, the Lacto-bacillus acidophilus is propagated in a malt wort or solution, under restricted conditions which inhibit the development of certain undesired bacteria, and in conjunction therewith an auxiliary propagation is accomplished which results in the final production of an acidophilus product which may be marketed in compressed form, and which is stable over long periods of time.

As a specific, but not limiting illustration of the steps which may be accomplished in practicing this invention, the following example is given:

Example

A malt wort or solution of approximately 4 Brix in density, is first acidified with lactic acid to an acidity of approximately 7 cc. of N/10 NaOH per 10 cc. The acid wort is seeded with the whey from a pure culture of Lacto-bacillus acidophilus in milk, employing approximately 10% of whey in proportion to the wort. The wort is then kept at a temperature of 30 to 34° C. for twenty-four to forty-eight hours. The seeded and developed wort is then seeded with ordinary yeast, and allowed to propagate or grow, with vigorous aeration, as employed in the production of compressed yeast, for twenty-four hours. The wort is then filtered in the usual way and the yeast and bacteria filtered off is compressed into cakes of suitable sizes, wrapped with tin foil, and stored and dispensed as in the case of ordinary compressed yeast.

The cakes thus produced are compressed masses of symbiotically developed Lacto-bacillus acidophilus and yeast. The cakes are found to maintain an ideal physical condition for the preservation of the Lacto-bacillus acidophilus, and the bacteria have been found in a living condition for a long time after the cakes have been prepared.

By "symbiotic relationship" and "symbiosis" is meant herein the mutually helpful association of two microorganisms (Lohnis & Fred, "Agricultural Bacteriology"), the association of two different organisms which live together, both being benefited (Guillermond & Tanner, "The Yeast", 1920, page 124), and the harmonious and reciprocal beneficial relationship between two microorganisms or groups of microorganisms (Buchanan & Fulmer, "Physiology of Bacteria", volume 3).

It will particularly be noted that advantage is taken of the symbiotical relationship of the Lacto-bacillus acidophilus and the yeast, by preparing in this example a malt solution which is of appropriate density for compressed yeast production, rendering it suitable for the development of acidophilus, propagating acidophilus therein whereby a large number of bacteria are developed, and whereby added advantage accrues in that a growth of the acidophilus seems to have a peptizing action on the protein of the malt and renders this peptizing more available for the yeast. Upon seeding with yeast, the developed wort, by reason of the symbiotical relationship of the two groups of microorganisms, gives rise to a rapid growth of both.

Further, in the compressed product itself, the natural moisture content of the yeast cells serves to protect the acidophilus from desiccation, while on the other hand, through the symbiotical relationship, the adsorptive properties of the yeast prevent plasmolysis of the bacterial cells upon drying.

By "ordinary yeast", I refer to the yeasts which are commercially utilizable in fermentation industries, such as Saccharomyces cerevisiæ or ellipsoideus, now employed for human consumption as vitamin-containing materials: in distinction from the so-called "wild yeasts", which are non-spore-forming, capable only of feeble fermentation, slow in growth and reproduction, and often genitors of offensive flavors.

The compressed mass so produced is in an ideal condition for human consumption, as it has all of the merits of the ordinary yeast, and in addition carries an acidophilus culture of known and dependable viability. The ingestion of such a combined cake, therefore, accomplishes two functions which are both of recognized importance and of well known therapeutic value.

Particularly, the initial propagation of the Lacto-bacillus acidophilus in the malt solution, prior to the seeding with yeast, not only does not inhibit the subsequent development of the latter, but is of actual advantage owing to the aforesaid peptizing action.

In practice it has been found that yields of acidophilus yeast obtainable from malt under such a procedure results on the average to substantially the same yield as obtained in the ordinary compressed yeast process.

While a specific illustration of practicing the present invention has been set forth, it is obvious that it may be practiced in many other ways without departing from the scope of the appended claims.

Having thus fully described my invention, what I claim as new and desire to secure by Letters Patent, is:—

1. A compressed mass of symbiotically grown Lacto-bacillus acidophilus and ordinary yeast.

2. The method of preparing a mass comprising symbiotically associated Lacto-bacillus acidophilus and ordinary yeast, which comprises preparing a culture medium, seeding the culture medium with Lacto-bacillus acidophilus and allowing the bacteria to develop, seeding developed culture medium with ordinary yeast, allowing the yeast and bacteria to develop symbiotically under vigorous aeration, and separating the symbiotically associated yeast and bacteria from the medium.

3. The method of producing a stable compressed combined yeast and Lacto-bacillus acidophilus therapeutic preparation which comprises preparing a malt wort, seeding the wort with Lacto-bacillus acidophilus and allowing the bacteria to develop for twenty-four to forty-eight hours, seeding the developed wort with ordinary yeast and allowing the yeast and bacteria to develop symbiotically under vigorous aeration, separating the combined yeast and bacteria from the wort and compressing the mixed yeast and bacteria.

4. The method of producing a therapeutic product containing Lacto-bacillus acidophilus which comprises producing a pure Lacto-bacillus acidophilus culture in milk, preparing a malt wort of proper density for compressed yeast production, acidifying the wort, seeding the worth with whey from the milk culture and allowing the bacteria to develop from twenty-four to forty-eight hours, seeding the developed wort with ordinary yeast, and allowing the bacteria and yeast to develop symbiotically under vigorous aeration.

5. The method of preparing therapeutic yeast which includes the steps of preparing a malt wort, acidifying the wort with lactic acid, seeding the wort with a pure culture of Lacto-bacillus acidophilus, and allowing the seeded wort to develop from twenty-four to forty-eight hours, seeding with ordinary yeast, and allowing the yeast and bacteria to develop symbiotically under vigorous aeration.

6. A compressed mass of symbiotically grown Lacto-bacillus acidophilus and ordinary yeast, in the substantial absence of culture medium.

WILLIAM LUDWELL OWEN.